United States Patent [19]
Close

[11] 4,265,953
[45] May 5, 1981

[54] INTUMESCENT STRESSED SKIN COMPOSITE MATERIAL

[75] Inventor: James R. Close, Roberts, Wis.

[73] Assignee: Minnesota Mining & Manufacturing Company, Saint Paul, Minn.

[21] Appl. No.: 18,437

[22] Filed: Mar. 7, 1979

[51] Int. Cl.³ ............... B32B 15/08; B32B 17/02; C04B 43/02; E04B 1/74
[52] U.S. Cl. .................... 428/78; 252/62; 428/256; 428/268; 428/310; 428/349; 428/354; 428/454; 428/457; 428/450; 428/913; 428/920; 438/438; 428/428
[58] Field of Search ............ 252/62; 428/77, 78, 428/343, 345, 396, 354, 349, 251, 268, 310, 324, 256, 454, 457, 538, 539, 913, 920

[56] References Cited

U.S. PATENT DOCUMENTS

| | | | |
|---|---|---|---|
| 3,336,153 | 8/1967 | Juda | 428/343 X |
| 3,867,245 | 2/1975 | Herman | 428/324 X |
| 3,916,057 | 10/1975 | Hatch et al. | 106/18.11 X |
| 3,979,537 | 9/1976 | Troyer | 428/77 X |
| 4,018,962 | 4/1977 | Pedlow | 428/245 |
| 4,022,248 | 5/1977 | Hepner et al. | 428/40 X |
| 4,043,862 | 8/1977 | Roberts | 428/454 X |
| 4,048,363 | 9/1977 | Langer et al. | 428/77 |
| 4,114,369 | 9/1978 | Crowley | 252/62 X |
| 4,156,752 | 5/1979 | Riccitiello et al. | 428/920 X |
| 4,159,302 | 6/1979 | Greve et al. | 428/538 X |

*Primary Examiner*—Harold Ansher
*Attorney, Agent, or Firm*—Cruzan Alexander; Donald M. Sell; Edward T. Okubo

[57] ABSTRACT

A composite or tape comprising a thin, flexible, compliant, strong, stressable substrate, a layer of flexible, resilient intumescent material adhered to the substrate and adhesive means for closing the substrate on itself. The composite or tape can be applied to a rigid body, the adhesive means applied and the intumescent material exfoliated to provide insulation enclosed by the substrate which becomes a stressed skin.

10 Claims, 5 Drawing Figures

INTUMESCENT STRESSED SKIN COMPOSITE MATERIAL

This invention relates to composites for applying insulation to rigid bodies such as portions of automobile exhaust systems and particularly to insulating wrappings with a stressed skin and to composite wrappings for forming such insulation.

There is a continual need to insulate equipment at very high or low temperatures from its environs either to avoid heat loss from the equipment or to avoid exposure of the environment and individuals in the environment to extremes of temperature. As an example, one may consider catalytic exhaust treating equipment which becomes very hot and can kindle fires in sufficiently flammable material which it contacts. Thus, a vehicle provided with such equipment should avoid entry into dry grasslands because of the danger of starting grass fires. Numerous similar hazardous situations can be envisaged and, indeed, are encountered. Accordingly various methods of insulation have been attempted.

Langer and Marlor, U.S. Pat. No. 4,048,363, describe an intumescent mounting pad comprising a first ply of intumescent sheet material having one adhesive-coated face with a second ply of intumescent sheet material longitudinally displaced from one end of the first ply and adhered to the adhesive coated face. This laminated structure is intended for wrapping around a catalyst support and enclosure in a casing before intumescence is effected.

Pedlow, U.S. Pat. No. 4,018,962, described a tape comprising a fabric sheet coated with a thermoplastic resin in which are incorporated filler, fibrous material and an intumescent composition. The tape is intended for protection against electrical arcing and fires which may result particularly in high voltage electrical cables.

Pipe insulation comprised of two semi-cylindrical segments of insulating material attached to a fabric backing is well known. This has been secured conventionally by straps. Hepner et al., U.S. Pat. No. 4,022,248, have provided adhesive strips lengthwise of the overlapping covering strip for securing the covering.

It is an object of this invention to provide an insulating wrapping which is resistant to external forces, readily secured in position and tightly fitting to the enclosed article.

In accordance with objects of the present invention, a thin, flexible, compliant, stressable substrate web is coated over at least a portion of its area on one surface with an adhesive composition, and a layer of flexible, resilient intumescent sheet material is adherently laminated to the adhesive over a portion of the same surface area. More particularly the present invention provides a self-securing composite insulating wrapping comprising a first web of flexible material, an adhesive substantially covering one face of said web and a second smaller web of intumescent sheet material positioned on and adhered to the adhesive covered surface of said first web of flexible material with the long dimensions of the two webs parallel and with the adhesive coated surface of said first web exposed along at least one edge of said second web.

The composite wrapping can be made in sheet or tape form depending upon the end use. For patching purposes, it may be desirable to construct the composite with the intumescent sheet material at the center with exposed adhesive along at least two opposite edges.

The substrate used for the first web must be flexible, strong, compliant and stressable. The tensile strength of the substrate material must be sufficient to withstand the pressures generated upon exfoliation of the intumescent material and should preferably be at least 1.75 kg/cm$^2$. Metal foils or thin metal sheets, fabrics of glass or ceramic fibers, or metal wire mesh may be used for this web. Metal foils including aluminum, copper, lead or steel are preferred. The fabrics include woven or nonwoven webs of thermally resistant fibers, such as glass fibers, $Al_2O_3.B_2O_3.SiO_2$ fabrics (U.S. Pat. No. 3,795,524), $ZrO_2.SiO_2$ fabrics (U.S. Pat. No. 3,709,706) and the like. Sheet polytetrafluoroethylene may also be used if the temperature requirements are not too severe. Wire mesh with apertures up to about 4 mm. may also be used.

The adhesives used to bond the intumescent sheet material to the substrate include organic and inorganic adhesives, such as silicone pressure sensitive adhesives, heat activated adhesives, alkali metal silicates, etc.

The intumescent sheet material can be an intumescent sheet material such as described in U. S. Pat. No. 3,916,057 by Hatch and Johnson, or other such materials. Although the Hatch et al sheet contains fibrous material, it is not essential; the intumescent sheet material can contain only an intumescent material and a suitable binder. The intumescent sheet material may also be a composition containing sodium silicate. In some cases, it may be desirable to utilize an intumescent sheet which contains both vermiculite and silicates.

The free expansion of an intumescent material is primarily a function of composition, particle size of the intumescent material and the method by which it is expanded. The free expansion of such intumescent material may be as great as 300% or more. The resilience of the expanded intumesced structure will be dependent upon the restraints imposed by the stressed skin. Thus an almost freely expanded structure will have less resilience but greater insulative properties whereas a highly stressed structure which restricts the expansion will be more resilient but will be less insulative.

In one embodiment of the invention, provision is made to protect the intumescent sheet material from deterioration when exposed directly to erosive action. Such ablation or erosion may occur when the insulating wrapping of the invention simultaneously serves to close an opening in the wall to which it is applied. In this embodiment, at least a portion of the intumescent sheet material is further protected by applicatiion of a third web material which is resistant to ablation, preferably thin metal sheet material of aluminum, stainless steel or, in special cases, noble metals.

The insulative wrapping material is wrapped or applied to whatever base is chosen with the intumescent sheet material inward; the latter is then intumesced or exfoliated to tension the outer sheet material. Exfoliation of the intumescent material may be carried out by either thermal or chemical means. For example, heating at about 350° C. to 600° C. for from about one to five minutes is adequate to exfoliate a vermiculite containing intumescent sheet material. Sodium silicate compositions may be exfoliated by heating from about 70° C. to 400° C. for about three minutes. Thermal exfoliation is convenient for such uses as an insulative wrap about parts of an auto exhaust system. Frequently, the heat in the exhaust system itself is sufficient to exfoliate the intumescent sheet.

If insulation is required on a plastic pipe, heating to exfoliate the intumescent material could damage the pipe and chemical exfoliation may be the method of choice for effecting exfoliation. Vermiculite can be exfoliated by wetting with a 30% hydrogen peroxide solution just prior to attaching it to the rigid body. Exfoliation occurs gradually at room temperature over a period of about ten minutes.

The resulting exfoliated material provides an insulating cover with properties such as reduced thermal conductivity, audio attenuation and vibrational damping depending upon the extent of expansion, density and resilience provided by the exfoliated intumescent material and its use is limited only by the tensile properties of the stressed skin. The terms insulation and insulating are here intended to include effects on any such functions as heat, sound and vibration.

Reference is now made to the drawings herewith wherein.

Figure 1:
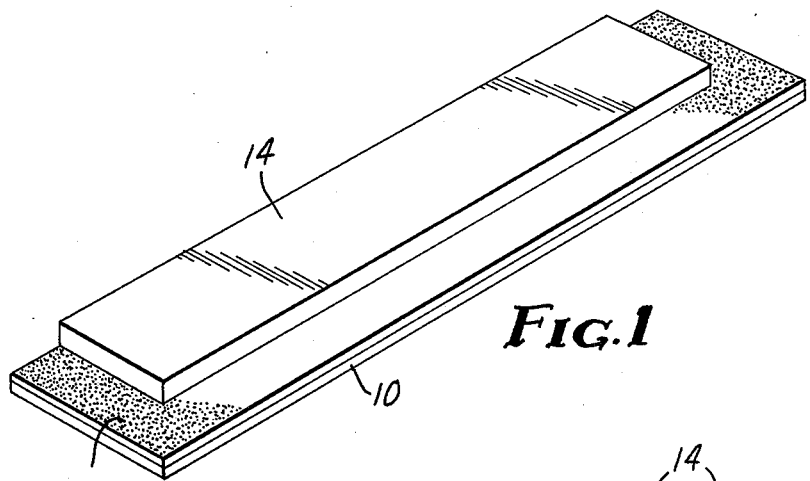
FIG. 1 is a perspective view of one embodiment of the invention.
Figure 2:
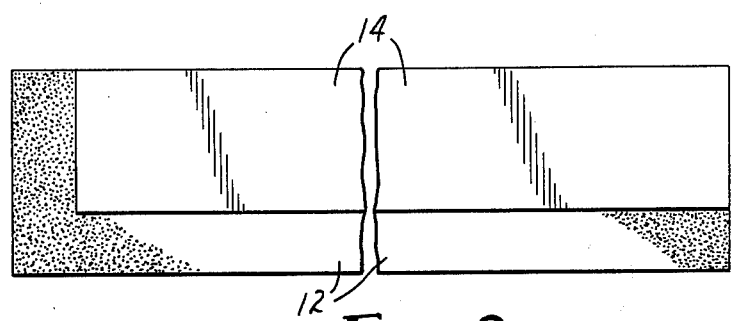
FIG. 2 is a view from above of an elongated article according to another embodiment of the invention, broken because of the length of the article.
Figure 3:
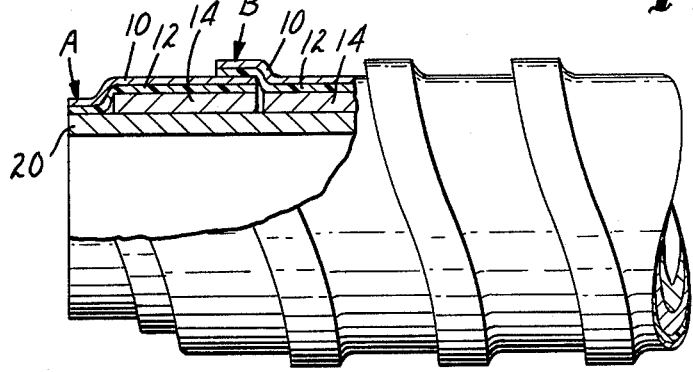
FIG. 3 shows a side view of the article of FIG. 2 wrapped around a pipe with a portion broken away to show structure.
Figure 4:
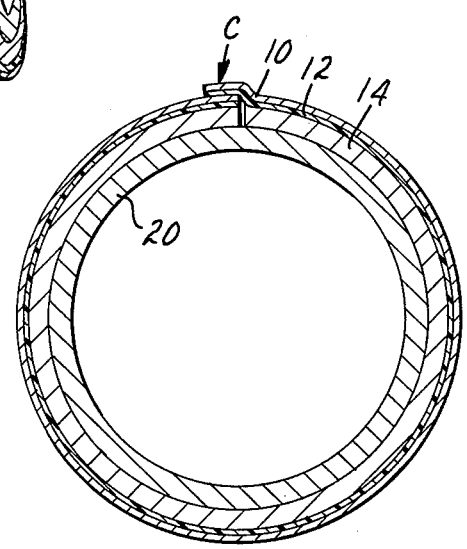
FIG. 4 shows in cross-section another method for applying articles of FIG. 1 or 2 to a pipe.

In the figures, a substrate (10) coated with adhesive (12) and intumescent sheet material (14) is seen with the adhesive exposed (or protected by a low adhesion backing sheet or liner—not shown) in FIGS. 1 and 2. FIG. 2 shows particularly and in diagrammatic fashion an extended tape of material having exposed adhesive (12) along one side and at one end. In FIG. 3, it is seen how the tape of FIG. 2 is wound helically around pipe (20) with the edge adhered to the pipe in the first convolution at A and overlapping the previous convolution as seen at B. In FIG. 4, a cross-section of a pipe (20) with tape such as that of FIG. 2 applied longitudinally with overlap at C is shown.

Figure 5:
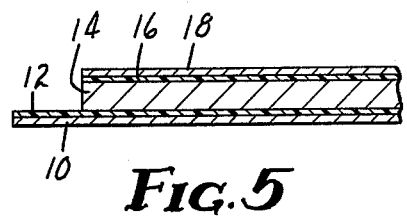
FIG. 5 shows in cross-section a piece of an article of the invention having a protective layer.

In FIG. 5, a small cross-sectional view of another embodiment is shown in which intumescent material (14) is adhered by adhesive (16) to an ablation resistant layer (18).

The invention is further explained by the following Examples.

EXAMPLE 1

Aluminum tape about 5 cm. wide having a pressure sensitive silicone adhesive on one face (available from Minnesota Mining and Manufacturing Company as tape Y417) is used as the stressable, flexible material for the first web. A 45.7 cm. length of this tape is cut from a supply roll and placed with the aluminum side down on a flat surface. A strip of clay-bonded vermiculite sheet, prepared as described in Example 4 of U.S. Pat. No. 3,916,057, measuring 3.8 cm. wide, 30.5 cm. long and 1.2 mm. thick, is employed as the second smaller intumescent web. It is centrally positioned along the length of the first web flush along one edge with its ends about 7.6 cm. from the ends of the first web. Thus about 1.3 cm. of exposed adhesive remains along the other edge of the first web. The resulting insulative wrapping is substantially as shown in FIG. 1. A strip of silicone release liner (not shown) was cut and placed over the exposed adhesive layer to prevent bonding during storage and handling.

In use, the liner is carefully removed from a length of the above insulative wrapping and the latter is carefully wrapped helically around the center portion of a lead pipe about 30 cm. long and 3.8 cm. in outside diameter as shown in FIG. 3. Wrapping is effected so that the side adhesive portion of each convolution bonds to a portion of the outer surface of the previous convolution. The adhesive ends of the wrapping adhere to the pipe. After the wrapping is secured, the wrapped pipe is clamped in a vertical position so that the heat from a Meeker burner passes upward through the pipe as in a chimney. The vermiculite in the intumescent web layer expands to form an insulating layer overcoated by the now stressed aluminum skin (first web) within about 5 minutes. Although the pipe itself is hot, the stressed skin is only barely warm to the touch.

EXAMPLE 2

A 45.7 cm. long by 5 cm. wide piece of the aluminum tape used in Example 1 is placed on a flat surface with the aluminum side down. A section of the intumescent mat, as described in Example 1, measuring 5 cm. by 10 cm. is centrally positioned on the adhesive side of aluminum tape about 18 cm. from each end. Another piece of the aluminum tape is cut 13 cm. long and positioned over the intumescent mat with its adhesive side toward the mat and overlapping the adhesive of the longer piece by about 1.5 cm. thus making adhesive-to-adhesive contact therewith. This short aluminum surface serves as an ablation resistant surface as noted above.

The resultant composite is used to patch an irregular hole about 2.5 cm. in diameter in an automobile muffler. The area containing the ablation resistant surface and the intumescent material is substantially centered over the hole in the muffler and the adhesive-coated ends of the aluminum tape are wrapped around the circumference of the muffler to hold the patch in place. The automobile is run so that heat is generated which exfoliates the intumescent material with the stressed skin holding the patch in place. The resulting patch serves as a temporary seal to repair the muffler for over six months of operation.

EXAMPLE 3

A 5 cm. wide and about 91 cm. long piece of electrical tape with a backing of glass fibers and a pressure sensitive silicone adhesive (available from Minnesota Mining and Manufacturing Company as Electrical Tape No. 69) is used as the stressable substrate. A strip of the clay-bonded vermiculite sheet of Example 1 measuring 3.8 cm. wide and about 81 cm. long is centered on the adhesive coated backing leaving exposed adhesive surfaces around all edges. The resulting strip is cut in two lengthwise and one section is wrapped carefully around a 3.8 cm. O.D. glass pipe starting with the end having exposed adhesive in a helix with edges overlapping as described in Example 1. Hydrogen peroxide solution (30%) is poured onto the vermiculite containing sheet on the exposed end and penetrates the intumescent sheet by a wicking action. Within about five minutes, the intumescent sheet exfoliates providing an insulating layer on the glass pipe with the glass fiber substrate as the stressed outer skin.

The second half of the strip is laid on a flat surface, and the intumescent sheet treated by applying 30% hydrogen peroxide solution to it rapidly with an eyedropper. The hydrogen peroxide saturated web is immediately wrapped around a 3.8 cm. O.D. ABS (acrylonitrile-butadiene-styrene copolymer) pipe. The resulting construction was an insulated ABS pipe similar to the insulated glass pipe.

EXAMPLE 4

A 5 cm. wide and 76 cm. long piece of the electrical tape of Example 3 is used as the stressable substrate. An intumescent sheet material 2.5 cm. wide by 63.5 cm. long and 0.6 cm. thick is made according to the compounding procedure set forth in German OS No. 2,820,873 from the following components (weight percent), said disclosure being incorporated herein by reference:

| | |
|---|---|
| Chloroprene rubber (Neoprene W) | 22.8 |
| Phenolic resin (Varcum 5485) | 10.0 |
| Sodium Silicate (Britesil H-24) | 51.1 |
| Silica (Min-U-Sil) | 7.3 |
| Magnesia (Maglite D) | 0.9 |
| Sulfur | 0.5 |
| Tetramethyl Thirum Monosulfide (Thionex) | 1.2 |
| N-Phenyl-Alpha-Napthylamine (Neozone A) | 0.5 |
| Red lead oxide | 1.2 |
| Chlorowax 500 | 4.5 |

The intumescent sheet is positioned carefully on the adhesive side of the tape as described in Example 1. The resulting composite is helically wrapped about the center portion of a 36 cm. long by 5.7 cm. O.D. stainless steel tube leaving about 10 cm. of unwrapped pipe at each end. The assembly was clamped in a vertical position and a Meeker burner was placed under the tube as in Example 1. The temperatures of the exposed ends and the wrapped section are measured at 3 minute intervals through thermocouples mounted at the indicated points. The results obtained are tabulated in Table 1.

TABLE 1

| Below Wrapped Section | Wrapped Section | Above Wrapped Section |
|---|---|---|
| 93° C. | 60° C. | 65° C. |
| 160° C. | 104° C. | 113° C. |
| 204° C. | 115° C. | 132° C. |
| 215° C. | 113° C. | 135° C. |

Expansion of the intumescent material began at about 100° C. and was essentially completed at 115° C. Subsequently, the temperature of the insulated section decreased whereas the other portions increased in temperature. After twelve minutes the temperatures reached equilibrium; heating was maintained for a further 20 minutes.

Generally, the composites of the present invention will be utilized as a thermal insulating material and the flexible and compliant characteristics permit the composite to be attached or wrapped to curved or irregular shaped sections. After exfoliation of the intumescent material, the stressed skin provides protection for the insulated section. The resiliency of the exfoliated composite permits the use of this insulating material in places subject to vibration, and additionally provides sound insulation and vibration damping.

What is claimed is:

1. A self-securing composite insulating wrapping comprising a first web of a thin, flexible, compliant, stressable material having a tensile strength of at least 1.75 kg/cm$^2$, an adhesive substantially covering one face of said web and a second smaller web of resilient intumescent sheet material positioned and adhered to the adhesive covered surface of said web of flexible material with the long dimensions of the two webs parallel with the adhesive coated surface of said first web exposed along at least one edge of said second web, said wrapping when applied onto a base material being capable of exfoliation by thermal or chemical means to provide a thermal insulating layer on said base material overcoated by a protective stressed outer skin.

2. A self-securing composite insulating wrapping according to claim 1 wherein said first web comprises metal foils or thin metal sheets.

3. A self-securing composite insulating wrapping according to claim 2 wherein said first web is a thin sheet of aluminum.

4. A self-securing composite insulating wrapping according to claim 1 wherein said first web is a woven glass fabric.

5. A self-securing composite insulating wrapping according to claim 2 wherein said second smaller web comprises an intumescent component and a binder.

6. A self-securing composite insulating wrapping according to claim 5 wherein said intumescent component is a hydrated alkali metal silicate.

7. A self-securing composite insulating wrapping according to claim 5 wherein said intumescent component is unexpanded vermiculite.

8. A self-securing composite insulating wrapping according to claim 2 having a third web of ablation-resistant material adhered to and covering at least a portion of the second web.

9. A self-securing composite insulating wrapping according to claim 1 wherein said first web comprises fabric of thermally resistant fibers.

10. A self-securing composite insulating wrapping according to claim 1 wherein said first web comprises a metal wire mesh.

* * * * *

UNITED STATES PATENT AND TRADEMARK OFFICE
CERTIFICATE OF CORRECTION

PATENT NO. : 4,265,953
DATED : May 5, 1981
INVENTOR(S) : Close, James R.

It is certified that error appears in the above—identified patent and that said Letters Patent is hereby corrected as shown below:

Column 6, line 22, after "parallel" insert -- and --;

Column 6, line 36, "claim 1" should read -- claim 9 --.

Signed and Sealed this

Eighteenth Day of August 1981

[SEAL]

Attest:

GERALD J. MOSSINGHOFF

Attesting Officer — Commissioner of Patents and Trademarks